(12) United States Patent
Park et al.

(10) Patent No.: US 10,690,223 B2
(45) Date of Patent: Jun. 23, 2020

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Juhyeon Park, Suwon-si (KR); Seongwook Ji, Gunpo-si (KR); Ki Tae Kim, Incheon (KR); Hyun Sik Kwon, Seoul (KR); Ilhan Yoo, Hwasun-eup (KR); Seong Wook Hwang, Gunpo-si (KR); Wonmin Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 25 days.

(21) Appl. No.: 16/189,560

(22) Filed: Nov. 13, 2018

(65) Prior Publication Data

US 2020/0063832 A1    Feb. 27, 2020

(30) Foreign Application Priority Data

Aug. 22, 2018  (KR) .................. 10-2018-0098118

(51) Int. Cl.
*F16H 3/62*   (2006.01)
*F16H 3/44*   (2006.01)

(52) U.S. Cl.
CPC ......... *F16H 3/62* (2013.01); *F16H 2003/442* (2013.01); *F16H 2200/0065* (2013.01);
(Continued)

(58) Field of Classification Search
CPC .......................... F16H 2200/201–2028; F16H 2200/2046–2048; F16H 2200/2007–201; F16H 2200/2048; F16H 3/666; F16H 3/66; F16H 3/62; F16H 2003/445; F16H 2200/0073; F16H 2003/442;
(Continued)

(56) References Cited

U.S. PATENT DOCUMENTS 7,311,634 B2 *  12/2007  Shim .................. F16H 3/663
                                              475/275
8,597,151 B1 *  12/2013  Noh ..................... F16H 3/66
                                              475/275
(Continued)

*Primary Examiner* — David R Morris
*Assistant Examiner* — Lillian T Nguyen
(74) *Attorney, Agent, or Firm* — Morgan, Lewis & Bockius LLP

(57) ABSTRACT

A planetary gear train of an automatic transmission for a vehicle may include: an input shaft receiving torque of an engine; an output shaft outputting torque and disposed in parallel with the input shaft; a compound planetary gear set having first, second, third, and fourth rotation elements and disposed at a radial external side of the input shaft; a simple planetary gear set having fifth, sixth, and seventh rotation elements and disposed at a radial external side of the output shaft; first to seventh shafts, each fixedly connected at least one among the first to seventh rotation elements; an eighth shaft selectively connectable to the input shaft; and two transfer gear sets operably connecting at least one shaft among the first to eighth shafts to another shaft.

15 Claims, 8 Drawing Sheets

(52) U.S. Cl.
CPC ............... *F16H 2200/0073* (2013.01); *F16H 2200/201* (2013.01); *F16H 2200/2046* (2013.01); *F16H 2200/2048* (2013.01)

(58) Field of Classification Search
CPC ........ F16H 2200/0065; F16H 2200/006–0078; F16H 2200/2023
See application file for complete search history.

(56) References Cited

U.S. PATENT DOCUMENTS

| | | | | |
|---|---|---|---|---|
| 8,764,602 | B2* | 7/2014 | Noh | F16H 3/62 475/215 |
| 2008/0108474 | A1* | 5/2008 | Seo | F16H 3/663 475/284 |
| 2009/0005208 | A1* | 1/2009 | Borgerson | F16H 3/66 475/219 |
| 2012/0053003 | A1* | 3/2012 | Hwang | F16H 3/666 475/271 |
| 2014/0128206 | A1* | 5/2014 | Noh | F16H 3/66 475/311 |
| 2014/0128207 | A1* | 5/2014 | Noh | F16H 3/66 475/311 |
| 2014/0128208 | A1* | 5/2014 | Noh | F16H 3/66 475/311 |
| 2014/0128210 | A1* | 5/2014 | Noh | F16H 3/666 475/311 |
| 2014/0162833 | A1* | 6/2014 | Noh | F16H 3/666 475/311 |
| 2015/0167791 | A1* | 6/2015 | Noh | F16H 3/62 475/302 |
| 2016/0215858 | A1* | 7/2016 | Lee | F16H 3/666 |

* cited by examiner

FIG. 2

| Speed stages | C1 | C2 | C3 | C4 | B1 | B2 | Gear ratios |
|---|---|---|---|---|---|---|---|
| D1 | ● |   | ● |   |   | ● | 4.871 |
| D2 |   | ● | ● |   |   | ● | 2.986 |
| D3 | ● | ● | ● |   |   |   | 2.200 |
| D4 |   | ● | ● | ● |   |   | 1.300 |
| D5 | ● | ● |   | ● |   |   | 0.749 |
| D6 |   | ● |   | ● |   | ● | 0.645 |
| D7 | ● |   |   | ● |   | ● | 0.560 |
| D8 |   |   |   | ● | ● | ● | 0.464 |
| D9 | ● |   |   | ● | ● |   | 0.401 |
| REV | ● |   | ● |   | ● |   | -5.280 |

FIG. 6

| Speed stages | C1 | C2 | C3 | C4 | B1 | B2 | B3 | Gear ratios |
|---|---|---|---|---|---|---|---|---|
| D1 | ● | | ● | | | | | 4.871 |
| D2 | | ● | ● | | | ● | | 2.986 |
| D3 | ● | ● | ● | | | | | 2.200 |
| D4 | | ● | ● | | | | ● | 1.553 |
| D5 | | ● | ● | ● | | | | 1.300 |
| D6 | | ● | | ● | | | ● | 1.005 |
| D7 | ● | ● | | ● | | | | 0.749 |
| D8 | | ● | | ● | | | | 0.645 |
| D9 | ● | | | ● | | ● | | 0.560 |
| D10 | | | | ● | ● | ● | | 0.464 |
| D11 | ● | | | ● | ● | | | 0.401 |
| REV | ● | | ● | | ● | | | -5.280 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2018-0098118 filed on Aug. 22, 2018, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle that improves power delivery performance and fuel economy by achieving more than nine forward speeds with a minimum number of constituent elements being used and forward speed, and improves installability by reducing a length of the automatic transmission.

Description of the Description of Related Art

Generally, an automatic transmission achieving more speed stages has been developed for enhancing fuel economy and optimizing drivability. Recently, increase of oil price is triggering a hard competition in enhancing fuel consumption of a vehicle.

Therefore, many researches for reducing weight and enhancing fuel economy through downsizing of an engine and for securing drivability and fuel economy through multiple speed stages of automatic transmissions have been developed.

However, in the automatic transmission, as the number of speed stages increase, the number of internal components (particularly, planetary gear sets) increase, and as a result, a length of the transmission increases. Therefore, mountability, cost, weight, transmission efficiency, and the like may still deteriorate.

Accordingly, development of a planetary gear train which may achieve maximum efficiency with a small number of components may be important to increase a fuel economy enhancement effect through the multiple-speeds.

In the present aspect, in recent years, a hybrid transmission using motors has been used as the automatic transmission, and installability to the vehicle has been improved by achieving eight forward speeds or less.

A conventional 8-speed automatic transmission typically may include three to four planetary gear sets and five to seven engagement elements (friction elements). In the instant case, since the length of the automatic transmission increases, installability may be deteriorated.

Recently, one planetary gear set is disposed above another planetary gear set, but structures of automatic transmissions to which parallel planetary gear sets is applied are very limited.

In another way, dog clutches instead of engagement elements of wet-type are used. However, shift feel may be deteriorated.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of achieving more than nine forward speeds by dividedly disposing three planetary gear sets, two external gears and more than six engagement elements on an input shaft and an output shaft disposed in parallel with and spaced from each other, and by connecting rotation elements of the three planetary gear sets through the two external gears and the more than six engagement elements. Therefore, a hybrid transmission may be easily implemented, power delivery performance and fuel economy may be improved due to multi-speed stages, and installability may be improved by shortening a length of the automatic transmission.

Furthermore, various aspects of the present invention are directed to providing a planetary gear train of an automatic transmission for a vehicle having further advantages of facilitating of setting optimum gear ratios due to ease of changing gear ratios of transfer gear sets, and accordingly improving power delivery performance and fuel economy.

A planetary gear train of an automatic transmission for a vehicle according to an exemplary embodiment of the present invention may include: an input shaft receiving torque of an engine; an output shaft outputting torque and disposed in parallel with the input shaft; a compound planetary gear set having first, second, third, and fourth rotation elements and disposed at a radial external side of the input shaft; a simple planetary gear set having fifth, sixth, and seventh rotation elements and disposed at a radial external side of the output shaft; a first shaft fixedly connected to the first rotation element and selectively connectable to the input shaft; a second shaft fixedly connected to the second rotation element and selectively connectable to the input shaft and a transmission housing; a third shaft fixedly connected to the third rotation element; a fourth shaft fixedly connected to the fourth rotation element and selectively connectable to the transmission housing; a fifth shaft fixedly connected to the fifth rotation element and fixedly connected to the output shaft; a sixth shaft fixedly connected to the sixth rotation element; a seventh shaft fixedly connected to the seventh rotation element and operably connected to the third shaft; and an eighth shaft selectively connectable to the input shaft and operably connected to the sixth shaft.

The planetary gear train may further include: a first transfer gear set disposed between the third shaft and the seventh shaft and operably connecting the third shaft to the seventh shaft; and a second transfer gear set disposed between the sixth shaft and the eighth shaft and operably connecting the sixth shaft to the eighth shaft.

The planetary gear train may further include: four clutches, each selectively connecting one shaft among the input shaft and the first to eighth shafts to another shaft; and two brakes, each selectively connecting one of the second shaft and the fourth shaft to the transmission housing.

The four clutches may include: a first clutch disposed between the input shaft and the first shaft; a second clutch disposed between the input shaft and the second shaft; a third clutch disposed between the fifth shaft and the seventh shaft; and a fourth clutch disposed between the input shaft and the eighth shaft.

The two brakes may include: a first brake disposed between the second shaft and the transmission housing; and a second brake disposed between the fourth shaft and the transmission housing.

In one aspect, the compound planetary gear set may include: a first planetary gear set being a single pinion planetary gear set and having a first sun gear, a first planet carrier, and a first ring gear as rotation elements thereof; and a second planetary gear set being a single pinion planetary gear set and having a second sun gear, a second planet carrier, and a second ring gear as rotation elements thereof, wherein the first rotation element is the first sun gear, the second rotation element is the first planet carrier and the second ring gear fixedly connected to each other, the third rotation element is the first ring gear and the second planet carrier fixedly connected to each other, and the fourth rotation element is the second sun gear.

The simple planetary gear set may be a single pinion planetary gear set and may have a third sun gear, a third planet carrier, and a third ring gear as rotation elements thereof, wherein the fifth rotation element is the third sun gear, the sixth rotation element is the third planet carrier, and the seventh rotation element is the third ring gear.

In another aspect, the compound planetary gear set may include: a first planetary gear set being a single pinion planetary gear set and having a first sun gear, a first planet carrier, and a first ring gear as rotation elements thereof; and a second planetary gear set being a single pinion planetary gear set and having a second sun gear, a second planet carrier, and a second ring gear as rotation elements thereof, wherein the first rotation element is the first and second sun gears fixedly connected to each other, the second rotation element is the second planet carrier, the third rotation element is the first planet carrier and the second ring gear fixedly connected to each other, and the fourth rotation element is the first ring gear.

The simple planetary gear set may be a single pinion planetary gear set and may have a third sun gear, a third planet carrier, and a third ring gear as rotation elements thereof, wherein the fifth rotation element is the third sun gear, the sixth rotation element is the third planet carrier, and the seventh rotation element is the third ring gear.

In other aspect, the compound planetary gear set may include: a first planetary gear set begin a double pinion planetary gear set and having a first sun gear, a first planet carrier, and a first ring gear as rotation elements thereof; and a second planetary gear set being a single pinion planetary gear set and having a second sun gear, a second planet carrier, and a second ring gear as rotation elements thereof, wherein the first rotation element is the first sun gear, the second rotation element is the first and second ring gears fixedly connected to each other, the third rotation element is the first and second planet carriers fixedly connected to each other, and the fourth rotation element is the second sun gear.

The simple planetary gear set may be a single pinion planetary gear set and may have a third sun gear, a third planet carrier, and a third ring gear as rotation elements thereof, wherein the fifth rotation element is the third sun gear, the sixth rotation element is the third planet carrier, and the seventh rotation element is the third ring gear.

In other aspect, the planetary gear train may further include a third brake disposed between the first shaft and the transmission housing.

A planetary gear train of an automatic transmission for a vehicle according to various exemplary embodiments of the present invention may include: an input shaft receiving torque of an engine; an output shaft outputting torque and disposed in parallel with the input shaft; a compound planetary gear set including a first planetary gear set having a first sun gear, a first planet carrier, and a first ring gear as rotation elements thereof, and a second planetary gear set having a second sun gear, a second planet carrier, and a second ring gear as rotation elements thereof, including first, second, third, and fourth rotation elements by fixedly connecting two rotation elements among the rotation elements of the first planetary gear set to two rotation elements among the rotation elements of the second planetary gear set, and disposed at a radial external side of the input shaft; and a simple planetary gear set having a third sun gear, a third planet carrier, and a third ring gear as rotation elements thereof and disposed at a radial external side of the output shaft, wherein the first rotation element is selectively connectable to the input shaft, the second rotation element is selectively connectable to the input shaft and a transmission housing, the fourth rotation element is selectively connectable to the transmission housing, the third sun gear is fixedly connected to the output shaft, the third planet carrier is selectively and operably connected to the input shaft, and the third ring gear is selectively connectable to the third sun gear and is operably connected to the third rotation element.

The planetary gear train may further include: a first transfer gear set disposed between the third rotation element and the third ring gear and operably connecting the third rotation element to the third ring gear; and a second transfer gear set disposed between the third planet carrier and the input shaft and operably connecting the third planet carrier to the input shaft.

The planetary gear train may further include: a first clutch disposed between the input shaft and the first rotation element; a second clutch disposed between the input shaft and the second rotation element; a third clutch disposed between the third sun gear and the third ring gear; a fourth clutch disposed between the input shaft and the second transfer gear set; a first brake disposed between the second rotation element and the transmission housing; and a second brake disposed between the fourth rotation element and the transmission housing.

In one aspect, each of the first and second planetary gear sets and the simple planetary gear set may be a single pinion planetary gear set, wherein the first rotation element is the first sun gear, the second rotation element is the first planet carrier and the second ring gear fixedly connected to each other, the third rotation element is the first ring gear and the second planet carrier fixedly connected to each other, and the fourth rotation element is the second sun gear.

In another aspect, each of the first and second planetary gear sets and the simple planetary gear set may be a single pinion planetary gear set, wherein the first rotation element is the first and second sun gears fixedly connected to each other, the second rotation element is the second planet carrier, the third rotation element is the first planet carrier and the second ring gear fixedly connected to each other, and the fourth rotation element is the first ring gear.

In other aspect, the first planetary gear set may be a double pinion planetary gear set and each of the second planetary gear set and the simple planetary gear set may be a single pinion planetary gear set, wherein the first rotation element is the first sun gear, the second rotation element is the first and second ring gears fixedly connected to each other, the third rotation element is the first and second planet carriers fixedly connected to each other, and the fourth rotation element is the second sun gear.

In other aspect, the planetary gear train may further include a third brake disposed between the first rotation element and the transmission housing.

A planetary gear train according to exemplary embodiments of the present invention reduces a length of an automatic transmission and thereby improves installability by dividedly disposing three planetary gear sets on an input shaft and an output shaft disposed in parallel with and spaced from each other.

Furthermore, optimum gear ratios may be set due to ease of changing gear ratios of two transfer gear sets as well as the planetary gear sets. Since gear ratios may be changed according to target performance, starting performance may be improved. Therefore, a start-up clutch instead of a torque converter may be used.

Furthermore, the planetary gear train according to the exemplary embodiments of the present invention may improve power delivery performance and fuel economy by achieving more than nine forward speeds.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of engagement elements at each speed stage in the planetary gear train according to the various exemplary embodiments of the present invention.

FIG. 6 is an operation chart of engagement elements at each speed stage in the planetary gear train according to the various exemplary embodiments of the present invention.

Figure 1:
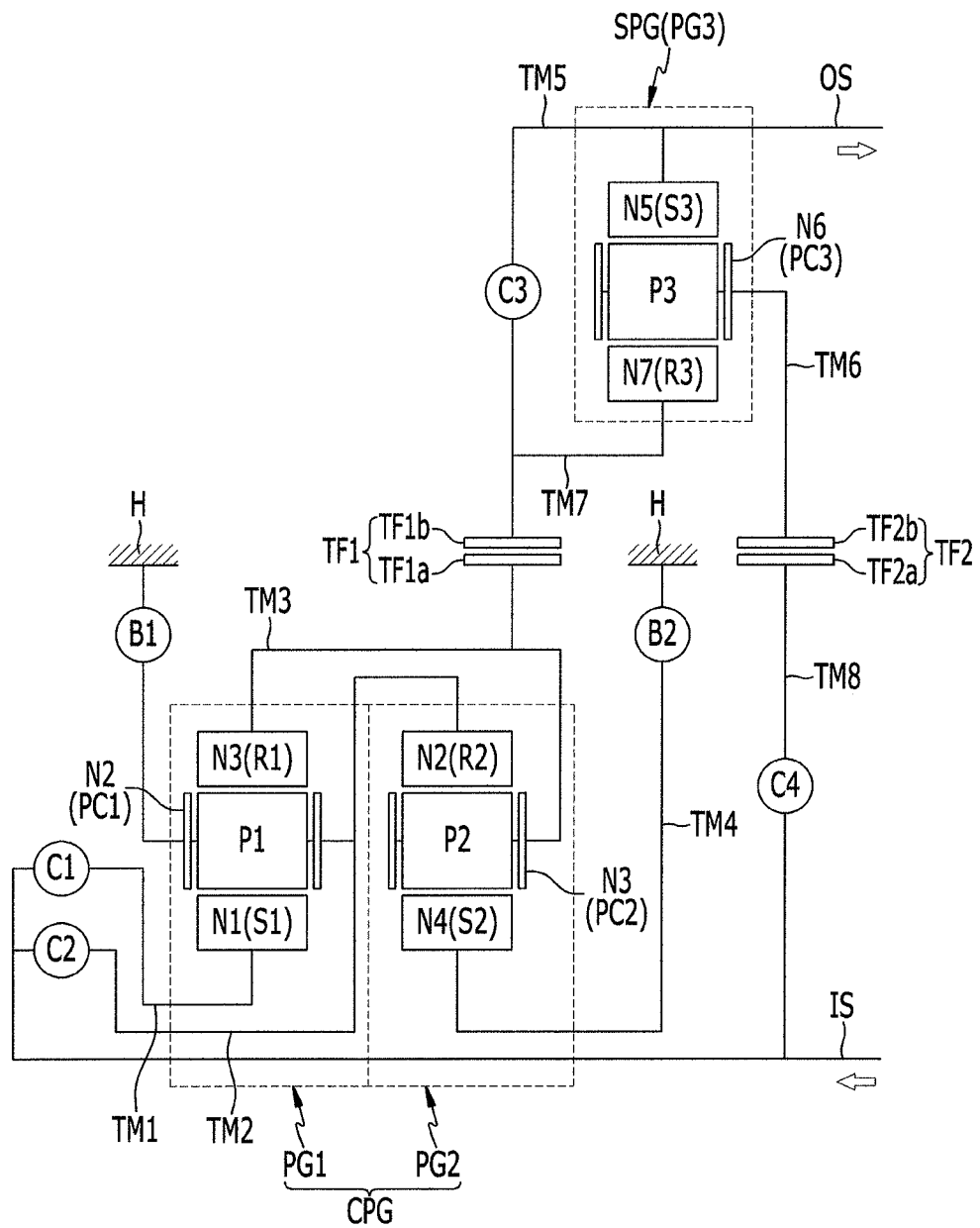
FIG. 1 is a schematic diagram of a planetary gear train according to the various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings.

However, parts which are not related with the description are omitted for clearly describing the exemplary embodiments of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a schematic diagram of a planetary gear train according to the various exemplary embodiments of the present invention.

Referring to FIG. 1, a planetary gear train according to various exemplary embodiments of the present invention includes an input shaft IS, an output shaft OS, a compound planetary gear set CPG, a simple planetary gear set SPG, two transfer gear sets TF1 and TF2, and engagement elements including four clutches C1, C2, C3, and C4 and two brakes B1 and B2.

The input shaft IS is an input member and a torque from a crankshaft of the engine is torque-converted through a torque converter to be input into the input shaft IS.

The output shaft OS is an output element, is disposed in parallel with and spaced from the input shaft IS, and transmits driving torque to a driving wheel through a differential apparatus.

The compound planetary gear set CPG includes first and second planetary gear sets PG1 and PG2 and is disposed at a radial external side of the input shaft IS. The simple planetary gear set SPG includes a third planetary gear set PG3 and is disposed at a radial external side of the output shaft OS.

The first planetary gear set PG1 is a single pinion planetary gear set and includes a first sun gear S1, a first planet carrier PC1 rotatably supporting a plurality of first pinion gears P1 engaged with the first sun gear S1, and a first ring gear R1 engaged with the plurality of first pinion gears P1 and operably connected to the first sun gear S1.

The second planetary gear set PG2 is a single pinion planetary gear set and includes a second sun gear S2, a second planet carrier PC2 rotatably supporting a plurality of second pinion gears P2 evenly disposed on and externally engaged with an external circumference of the second sun gear S2, and a second ring gear R2 engaged with the plurality of second pinion gears P2 and operably connected to the second sun gear S2.

The first planet carrier PC1 is fixedly connected to the second ring gear R2 and the first ring gear R1 is fixedly connected to the second planet carrier PC2 such that the first and second planetary gear sets PG1 and PG2 include four rotation elements N1, N2, N3, and N4.

In further detail, the first sun gear S1 is set as the first rotation element N1, the fixedly connected first planet carrier PC1 and the second ring gear R2 are set as the second rotation element N2, the fixedly connected first ring gear R1 and the second planet carrier PC2 are set as the third rotation element N3, and the second sun gear S2 is set as the fourth rotation element N4.

The third planetary gear set PG3 is a single pinion planetary gear set and includes a third sun gear S3, a third planet carrier PC3 rotatably supporting a plurality of third pinion gears P3 evenly disposed on and externally engaged with an external circumference of the third sun gear S3, and a third ring gear R3 engaged with the plurality of third pinion gears P3 and operably connected to the third sun gear S3.

The third planetary gear set PG3 includes three rotation elements N5, N6, and N7. The third sun gear S3 is set as the fifth rotation element N5, the third planet carrier PC3 is set as the sixth rotation element N6, and the third ring gear R3 is set as the seventh rotation element N7.

Here, the term "operably connected" or the like means at least two members are directly or indirectly connected to each other. However, two members that are operably connected to each other do not always rotate with the same rotation speed and in the same rotation direction thereof.

Here, at least one of the seven rotation element N1 to N7, the input shaft IS, and the output shaft OS is connected to at least one of first to eighth shafts TM1 to TM8 directly or through at least one of the four clutches C1 to C4, the two brakes B1 and B2, and the two transfer gear sets TF1 and TF2.

The first to eighth shafts TM1 to TM8 will be described in detail.

The first shaft TM1 is fixedly connected to the first rotation element N1 (first sun gear S1) and is selectively connectable to the input shaft IS.

The second shaft TM2 is fixedly connected to the second rotation element N2 (first planet carrier PC1 and second ring gear R2) and is selectively connectable to the input shaft IS and a transmission housing H.

The third shaft TM3 is fixedly connected to the third rotation element N3 (first ring gear R1 and second planet carrier PC2).

The fourth shaft TM4 is fixedly connected to the fourth rotation element N4 (second sun gear S2) and is selectively connectable to the transmission housing H.

The fifth shaft TM5 is fixedly connected to the fifth rotation element N5 (third sun gear S3) and is fixedly connected to the output shaft OS.

The sixth shaft TM6 is fixedly connected to the sixth rotation element N6 (third planet carrier PC3).

The seventh shaft TM7 is fixedly connected to the seventh rotation element N7 (third ring gear R3) and is operably connected to the third shaft TM3 through the first transfer gear set TF1.

The eighth shaft TM8 is selectively connectable to the input shaft IS and is operably connected to the sixth shaft TM6 through the second transfer gear set TF2.

The first to eighth shafts TM1 to TM8 fixedly connects a plurality of rotation elements among the rotation elements of the planetary gear sets PG1, PG2, and PG3 with each other, are rotation members that are connected to any one rotation element and rotate with the any one rotation element to transmit torque, are rotation members that selectively connects any one rotation element with the transmission housing H, or are fixing members that fixedly connect any one rotation element to the transmission housing H.

Here, the term "fixedly connected" or the like means at least two members are connected to each other to always rotate without rotation speed difference. That is, at least two members that are fixedly connected to each other always rotate with the same rotation speed and in the same rotation direction thereof. Therefore, it is to be understood by a person of an ordinary skill in the art that the term "fixedly connected" or the like differs the term "operably connected" or the like.

Here, the term "selectively connectable" or the like means a plurality of shafts including the input shaft and the output shaft are connectable to each other through at least one of the engagement elements to rotate with the same rotation speed and in the same rotation direction thereof, or are connectable to the transmission housing through at least one of the engagement elements to be fixed to the transmission housing.

In other words, in a case that the engagement element selectively connects a plurality of shafts to each other, the plurality of shafts rotates with the same rotation speed and in the same rotation direction when the engagement element operates but the plurality of shafts are disconnected from each other when the engagement element is released.

Furthermore, in a case that the engagement element selectively connects any one shaft to the transmission housing, the corresponding shaft is fixedly connected to the transmission housing when the engagement element operates but the corresponding shaft is rotatable when the engagement element is released.

Each of the four clutches C1, C2, C3, and C4 is disposed at a portion at which any two shafts among the first to eighth shafts TM1 to TM8 and the input shaft IS are selectively connectable to each other.

Furthermore, each of the two brakes B1 and B2 is disposed at a portion at which any one shaft among the first to eighth shafts TM1 to TM8 is selectively connectable to the transmission housing H.

Arrangement of the four clutches C1 to C4 and the two brakes B1 and B2 will be described in detail.

The first clutch C1 is disposed between the input shaft IS and the first shaft TM1 (first rotation element N1) and selectively connects the input shaft IS to the first shaft TM1.

The second clutch C2 is disposed between the input shaft IS and the second shaft TM2 (second rotation element N2) and selectively connects the input shaft IS to the second shaft TM2.

The third clutch C3 is disposed between the fifth shaft TM5 (fifth rotation element N5) and the seventh shaft TM7 (seventh rotation element N7) and selectively connects the fifth shaft TM5 to the seventh shaft TM7. Therefore, if the third clutch C3 is operated, the third planetary gear set PG3 becomes a lock-up state.

The fourth clutch C4 is disposed between the input shaft IS and the eighth shaft TM8 and selectively connects the input shaft IS to the eighth shaft TM8.

The first brake B1 is disposed between the second shaft TM2 (second rotation element N2) and the transmission housing H and selectively connects and fixes the second shaft TM2 to the transmission housing H.

The second brake B2 is disposed between the fourth shaft TM4 (fourth rotation element N4) and the transmission housing H and selectively connects and fixes the fourth shaft TM4 to the transmission housing H.

The engagement elements including the first, second, third, and fourth clutches C1, C2, C3, and C4 and the first and second brakes B1 and B2 may be multi-plates friction elements of wet type that are operated by hydraulic pressure. Multi-plates friction elements of wet type are mainly used as the engagement elements, but dog clutches, electric clutches, or magnetic clutches which may be operated by electric signal from an electric control unit may be used as the engagement elements.

Each of the two transfer gear sets TF1 and TF2 is disposed at a portion at which one shaft is operably connected to another shaft.

The first transfer gear set TF1 includes a first transfer drive gear TF1a connected to the third shaft TM3 (third rotation element N3) and a first transfer driven gear TF1b connected to the seventh shaft TM7 (seventh rotation element N7, and operably connects the third shaft TM3 to the seventh shaft TM7.

The second transfer gear set TF2 includes a second transfer drive gear TF2a connected to the eighth shaft TM8 and a second transfer driven gear TF2b connected to the sixth shaft TM6 (sixth rotation element N6), and operably connects the sixth shaft TM6 to the eighth shaft TM8.

Any two shafts connected to each other through each of the first and second transfer gear sets TF1 and TF2 rotate in opposite direction thereof. Gear ratios of the first and second transfer gear sets TF1 and TF2 are set according to speed ratios demanded by the transmission. The gear ratios of the first and second transfer gear sets TF1 and TF2 are different from each other in the various exemplary embodiments of the present invention.

FIG. 2 is an operation chart of engagement elements at each speed stage in the planetary gear train according to the various exemplary embodiments of the present invention.

Referring to FIG. 2, three engagement elements among the first, second, third, and fourth clutches C1, C2, C3, and C4 and the first and second brakes B1 and B2 are operated at each speed stage in the planetary gear train according to the various exemplary embodiments of the present invention. The planetary gear train according to the various exemplary embodiments of the present invention can achieve nine forward speeds and one reverse speed. Shifting processes will be described.

[First Forward Speed]

The first and third clutches C1 and C3 and the second brake B2 are operated at a first forward speed D1.

In a state that the first shaft TM1 is connected to the input shaft IS by operation of the first clutch C1 and a torque of the input shaft IS is input to the first shaft TM1, the fourth shaft TM4 is operated as the fixed element by operation of the second brake B2. Therefore, the compound planetary gear set CPG outputs torque converted according to a predetermined gear ratio through the third shaft TM3.

The torque of the third shaft TM3 is converted according to the gear ratio of the first transfer gear set TF1 and the converted torque is input to the seventh shaft TM7 as inverse rotation speed.

The simple planetary gear set SPG becomes the lock-up state by operation of the third clutch C3 such that the torque input through the seventh shaft TM7 is output through the output shaft OS without change of rotation speed. Therefore, the vehicle can run at the first forward speed.

[Second Forward Speed]

The second and third clutches C2 and C3 and the second brake B2 are operated at a second forward speed D2.

In a state that the second shaft TM2 is connected to the input shaft IS by operation of the second clutch C2 and the torque of the input shaft IS is input to the second shaft TM2, the fourth shaft TM4 is operated as the fixed element by operation of the second brake B2. Therefore, the compound planetary gear set CPG outputs torque converted according to a predetermined gear ratio through the third shaft TM3. Since the shaft to which the torque of the input shaft IS is input is changed, rotation speed of the torque output through the third shaft TM3 at the second forward speed is different from that output through the third shaft TM3 at the first forward speed.

The torque of the third shaft TM3 is converted according to the gear ratio of the first transfer gear set TF1 and the converted torque is input to the seventh shaft TM7 as inverse rotation speed.

The simple planetary gear set SPG becomes the lock-up state by operation of the third clutch C3 such that the torque input through the seventh shaft TM7 is output through the output shaft OS without change of rotation speed. Therefore, the vehicle can run at the second forward speed.

[Third Forward Speed]

The first, second, and third clutches C1, C2, and C3 are operated at a third forward speed D3.

The first shaft TM1 and the second shaft TM2 are connected to the input shaft IS by operation of the first clutch and second clutch C1 and C2 such that the torque of the input shaft IS is input to the first and second shafts TM1 and TM2. Therefore, the compound planetary gear set CPG becomes a lock-up state and the torque of the input shaft IS is output through the third shaft TM3 without change of rotation speed.

The torque of the third shaft TM3 is converted according to the gear ratio of the first transfer gear set TF1 and the converted torque is input to the seventh shaft TM7 as inverse rotation speed.

The simple planetary gear set SPG becomes the lock-up state by operation of the third clutch C3 such that the torque input through the seventh shaft TM7 is output through the output shaft OS without change of rotation speed. Therefore, the vehicle can run at the third forward speed.

[Fourth Forward Speed]

The second, third, and fourth clutches C2, C3, and C4 are operated at a fourth forward speed D4.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed.

The simple planetary gear set SPG becomes the lock-up state by operation of the third clutch C3 such that the torque input through the sixth shaft TM6 is output through the output shaft OS without change of rotation speed. Therefore, the vehicle can run at the fourth forward speed.

Meanwhile, through the second shaft TM2 is connected to the input shaft IS by operation of the second clutch C2 such that the torque of the input shaft IS is input to the second shaft TM2, the torque of the second shaft TM2 does not affect the fourth forward speed. The second and fourth shafts TM2 and TM4 run idle due to rotation speed difference between the torque transmitted to the third shaft TM3 through the seventh shaft TM7 and the torque of the input shaft IS input to the second shaft TM2.

[Fifth Forward Speed]

The first, second, and fourth clutches C1, C2, and C4 are operated at a fifth forward speed D5.

The first shaft TM1 and the second shaft TM2 are connected to the input shaft IS by operation of the first clutch and second clutch C1 and C2 such that the torque of the input shaft IS is input to the first and second shafts TM1 and TM2. Therefore, the compound planetary gear set CPG becomes the lock-up state and the torque of the input shaft IS is output through the third shaft TM3 without change of rotation speed.

The torque of the third shaft TM3 is converted according to a gear ratio of the first transfer gear set TF1 and the converted torque is input to the seventh shaft TM7 as inverse rotation speed.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed.

Therefore, the simple planetary gear set SPG outputs torque shifted by a difference between rotation speed of the seventh shaft TM7 and rotation speed of the sixth shaft TM6 through the fifth shaft TM5. Therefore, the vehicle can run at the fifth forward speed.

[Sixth Forward Speed]

The second and fourth clutches C2 and C4 and the second brake B2 are operated at a sixth forward speed D6.

In a state that the second shaft TM2 is connected to the input shaft IS by operation of the second clutch C2 and the torque of the input shaft IS is input to the second shaft TM2, the fourth shaft TM4 is operated as the fixed element by operation of the second brake B2. Therefore, the compound planetary gear set CPG outputs the torque converted according to the predetermined gear ratio through the third shaft TM3.

The torque of the third shaft TM3 is converted according to the gear ratio of the first transfer gear set TF1 and the converted torque is input to the seventh shaft TM7 as inverse rotation speed.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed.

Therefore, the simple planetary gear set SPG outputs torque shifted by a difference between rotation speed of the seventh shaft TM7 and rotation speed of the sixth shaft TM6 through the fifth shaft TM5. Therefore, the vehicle can run at the sixth forward speed.

[Seventh Forward Speed]

The first and fourth clutches C1 and C4 and the second brake B2 are operated at a seventh forward speed D7.

In a state that the first shaft TM1 is connected to the input shaft IS by operation of the first clutch C1 and the torque of the input shaft IS is input to the first shaft TM1, the fourth shaft TM4 is operated as the fixed element by operation of the second brake B2. Therefore, the compound planetary gear set CPG outputs the torque converted according to the predetermined gear ratio through the third shaft TM3.

The torque of the third shaft TM3 is converted according to the gear ratio of the first transfer gear set TF1 and the converted torque is input to the seventh shaft TM7 as inverse rotation speed.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed.

Therefore, the simple planetary gear set SPG outputs torque shifted by a difference between rotation speed of the seventh shaft TM7 and rotation speed of the sixth shaft TM6 through the fifth shaft TM5. Therefore, the vehicle runs at the seventh forward speed.

[Eighth Forward Speed]

The fourth clutch C4 and the first and second brakes B1 and B2 are operated at an eighth forward speed D8.

The first shaft TM1 and the second shaft TM2 are stopped by operation of the first and second brakes B1 and B2 such that the compound planetary gear set CPG becomes the lock-up state.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed. At the present state, the seventh shaft TM7 operably connected to the third shaft TM3 is operated as the fixed element.

Therefore, the vehicle can run at the eighth forward speed.

[Ninth Forward Speed]

The first and fourth clutches C1 and C4 and the first brake B1 are operated at a ninth forward speed D9.

In a state that the first shaft TM1 is connected to the input shaft IS by operation of the first clutch C1 and the torque of the input shaft IS is input to the first shaft TM1, the second shaft TM2 is operated as the fixed element by operation of the first brake B1. Therefore, the compound planetary gear set CPG outputs torque with inverse rotation speed through the third shaft TM3. The torque of the third shaft TM3 with inverse rotation speed is converted according to the gear ratio of the first transfer gear set TF1, and the converted torque is input to the seventh shaft TM7 of the simple planetary gear set SPG as normal rotation speed.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed.

Therefore, the simple planetary gear set SPG output torque shifted by a difference between normal rotation speed of the seventh shaft TM7 and inverse rotation speed of the sixth shaft TM6 through the fifth shaft TM5. Therefore, the vehicle can run at the ninth forward speed.

[Reverse Speed]

The first and third clutches C1 and C3 and the first brake B1 are operated at a reverse speed REV.

In a state that the first shaft TM1 is connected to the input shaft IS by operation of the first clutch C1 and the torque of the input shaft IS is input to the first shaft TM1, the second shaft TM2 is operated as the fixed element by operation of the first brake B1. Therefore, the compound planetary gear set CPG outputs the torque with inverse rotation speed through the third shaft TM3. The torque of the third shaft TM3 with inverse rotation speed is converted according to the gear ratio of the first transfer gear set TF1, and the converted torque is input to the seventh shaft TM7 of the simple planetary gear set SPG as normal rotation speed.

The simple planetary gear set SPG becomes the lock-up state by operation of the third clutch C3 such that the torque input through the seventh shaft TM7 is output through the output shaft OS without change of rotation speed. Therefore, the vehicle can run at the reverse speed.

Here, 'normal rotation' means rotation in the same rotation direction as that of the engine, and 'inverse rotation' means rotation in opposite rotation direction to the rotation direction of the engine.

Figure 3:
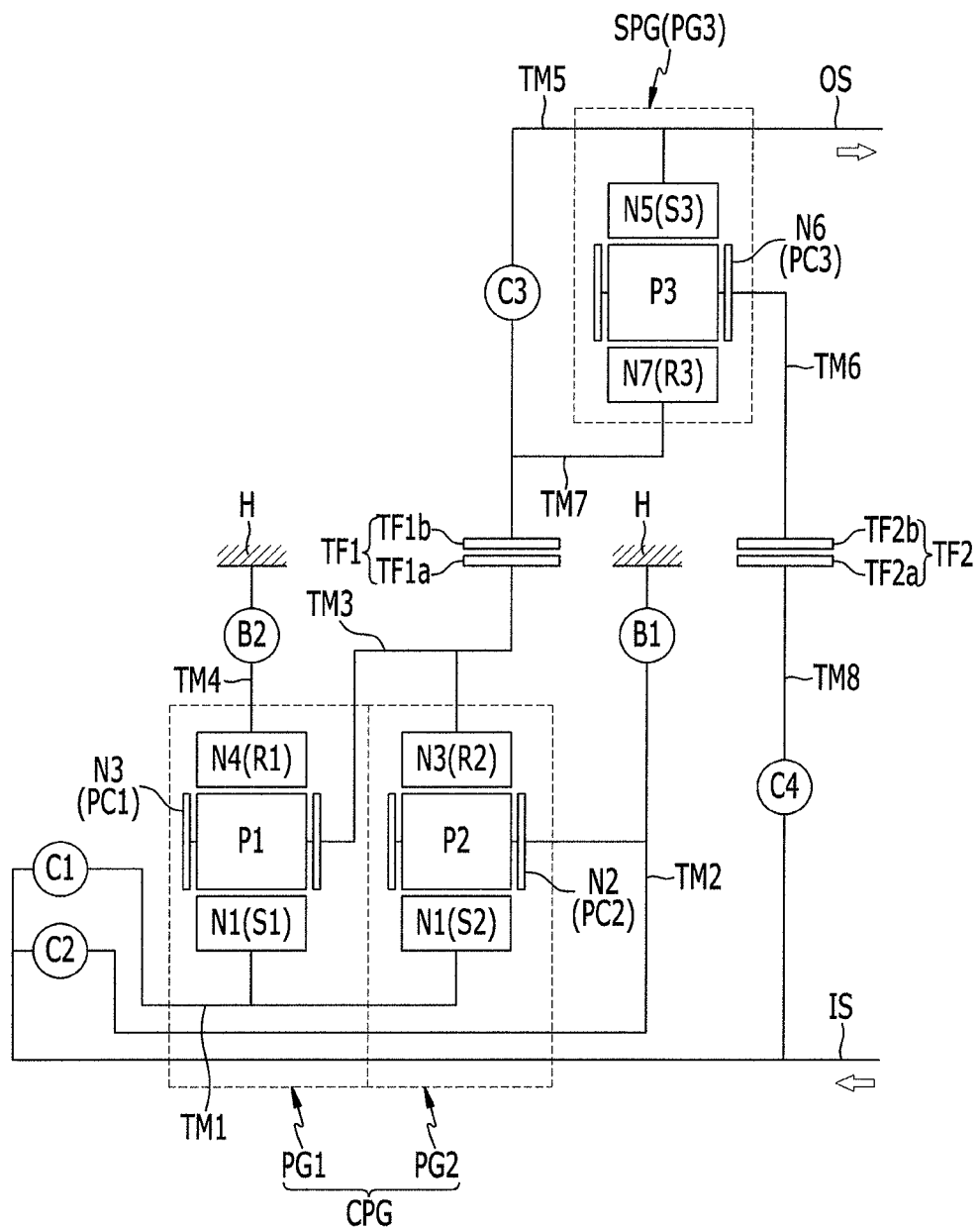
FIG. 3 is a schematic diagram of a planetary gear train according to the various exemplary embodiments of the present invention.

FIG. 3 is a schematic diagram of a planetary gear train according to the various exemplary embodiments of the present invention.

Referring to FIG. 3, the compound planetary gear set CPG includes the first and second planetary gear sets PG1 and PG2 being the single pinion planetary gear sets, wherein the first sun gear S1 is fixedly connected to the second sun gear S2 and the first planet carrier PC1 is fixedly connected to the second ring gear R2 such that the compound planetary gear set CPG includes four rotation elements N1, N2, N3, and N4 in the planetary gear train according to the various exemplary embodiments of the present invention.

According to the various exemplary embodiments of the present invention, the first and the second sun gears S1 and S2 are set as the first rotation element N1 fixedly connected to the first shaft TM1, the second planet carrier PC2 is set as the second rotation element N2 fixedly connected to the second shaft TM2, the first planet carrier PC1 and the second ring gear R2 are set as the third rotation element N3 fixedly connected to the third shaft TM3, and the first ring gear R1 is set as the fourth rotation element N4 fixedly connected to the fourth shaft TM4.

Since operation and shifting processes of the planetary gear train according to the various exemplary embodiments of the present invention are the same as those according to the various exemplary embodiments of the present invention in FIG. 1, detailed description of the various exemplary embodiments will be omitted.

Figure 4:
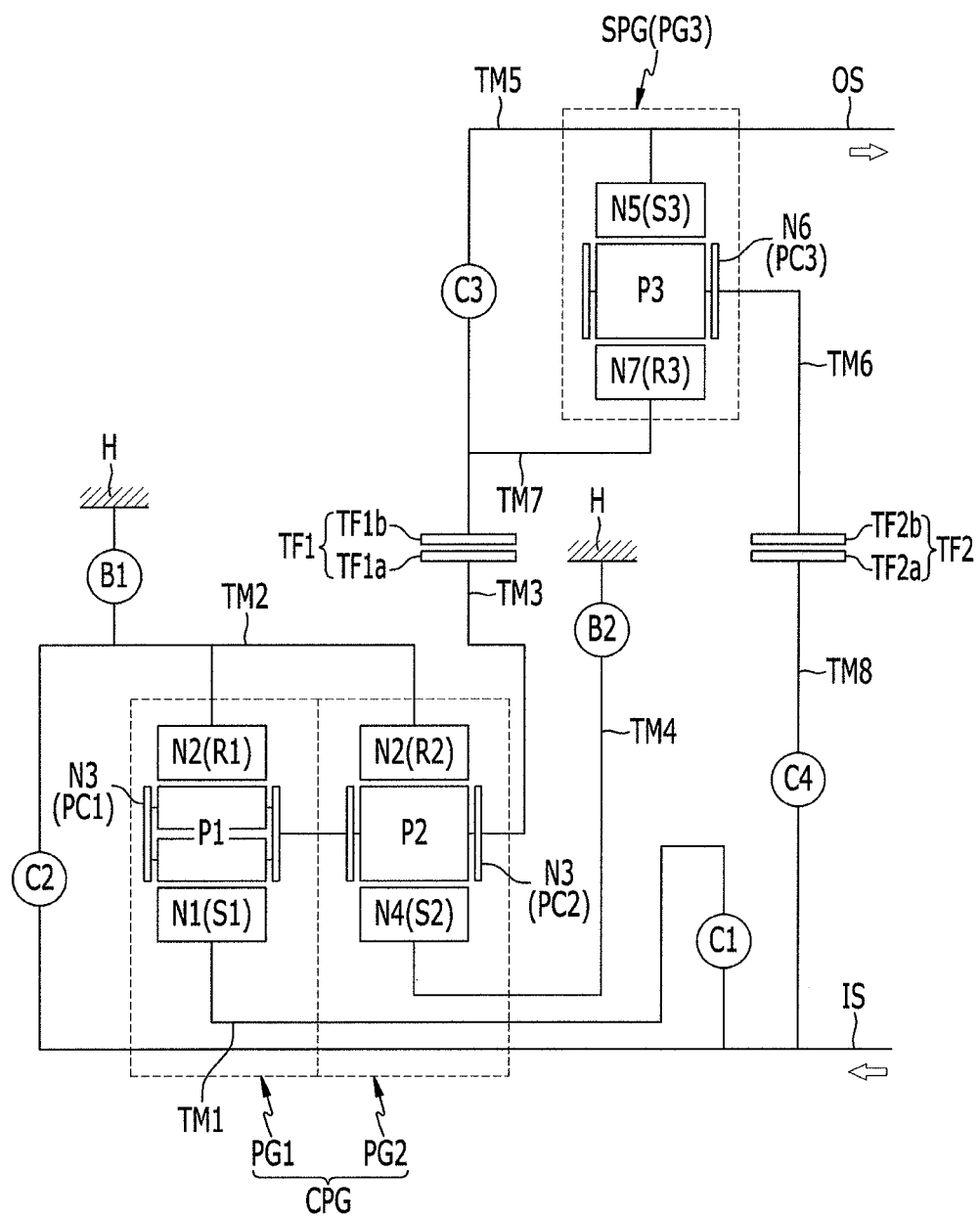
FIG. 4 is a schematic diagram of a planetary gear train according to the various exemplary embodiments of the present invention.

FIG. 4 is a schematic diagram of a planetary gear train according to the various exemplary embodiments of the present invention.

Referring to FIG. 4, the compound planetary gear set CPG includes the first planetary gear set PG1 being a double pinion planetary gear set and the second planetary gear set PG2 being the single pinion planetary gear set, wherein the first planet carrier PC1 is fixedly connected to the second planet carrier PC2 and the first ring gear R1 is fixedly connected to the second ring gear R2 such that the compound planetary gear set CPG includes four rotation elements N1, N2, N3, and N4 in the planetary gear train according to the various exemplary embodiments of the present invention.

According to the various exemplary embodiments of the present invention, the first sun gear S1 is set as the first rotation element N1 fixedly connected to the first shaft TM1, the first and second ring gears R1 and R2 are set as the second rotation element N2 fixedly connected to the second shaft TM2, the first and second planet carriers PC1 and PC2 are set as the third rotation element N3 fixedly connected to the third shaft TM3, and the second sun gear S2 is set as the fourth rotation element N4 fixedly connected to the fourth shaft TM4.

Since operation and shifting processes of the planetary gear train according to the various exemplary embodiments of the present invention are the same as those according to the various exemplary embodiments of the present invention in FIG. 1, detailed description of the various exemplary embodiments will be omitted.

Figure 5:
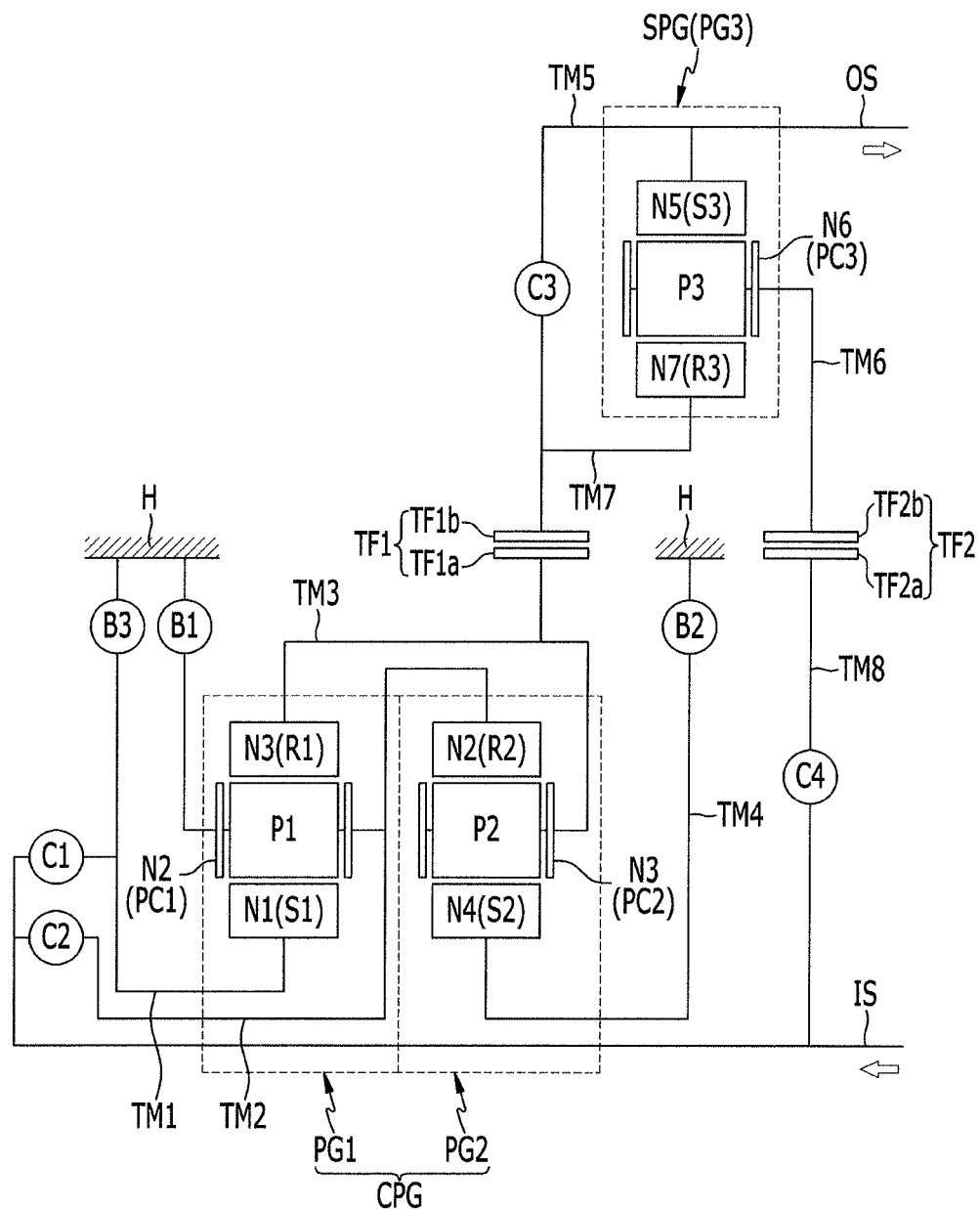
FIG. 5 is a schematic diagram of a planetary gear train according to the various exemplary embodiments of the present invention.

FIG. 5 is a schematic diagram of a planetary gear train according to the various exemplary embodiments of the present invention.

Referring to FIG. 5, a third brake B3 is additionally disposed between the first shaft TM1 and the transmission housing of the planetary gear train according to the various exemplary embodiments such that the first shaft TM1 is operated as a selective input element and a selective fixed element in a planetary gear train according to the various exemplary embodiments of the present invention. Therefore, the planetary gear train according to the various exemplary embodiments of the present invention can achieve eleven forward speeds and one reverse speed.

FIG. 6 is an operation chart of engagement elements at each speed stage in the planetary gear train according to the various exemplary embodiments of the present invention.

Referring to FIG. 6, three engagement elements among the first, second, third, and fourth clutches C1, C2, C3, and C4 and the first, second, and third brakes B1, B2, and B3 are operated at each speed stage in the planetary gear train according to the various exemplary embodiments of the present invention. The planetary gear train according to the various exemplary embodiments of the present invention can achieve eleven forward speeds and one reverse speed. Shifting processes will be described.

[First Forward Speed]

The first and third clutches C1 and C3 and the second brake B2 are operated at the first forward speed D1.

In a state that the first shaft TM1 is connected to the input shaft IS by operation of the first clutch C1 and the torque of the input shaft IS is input to the first shaft TM1, the fourth shaft TM4 is operated as the fixed element by operation of the second brake B2. Therefore, the compound planetary gear set CPG outputs the torque converted according to the predetermined gear ratio through the third shaft TM3.

The torque of the third shaft TM3 is converted according to the gear ratio of the first transfer gear set TF1 and the converted torque is input to the seventh shaft TM7 as inverse rotation speed.

The simple planetary gear set SPG becomes the lock-up state by operation of the third clutch C3 such that the torque input through the seventh shaft TM7 is output through the output shaft OS without change of rotation speed. Therefore, the vehicle can run at the first forward speed.

[Second Forward Speed]

The second and third clutches C2 and C3 and the second brake B2 are operated at the second forward speed D2.

In a state that the second shaft TM2 is connected to the input shaft IS by operation of the second clutch C2 and the torque of the input shaft IS is input to the second shaft TM2, the fourth shaft TM4 is operated as the fixed element by operation of the second brake B2. Therefore, the compound planetary gear set CPG outputs the torque converted according to the predetermined gear ratio through the third shaft TM3. Since the shaft to which the torque of the input shaft IS is input is changed, rotation speed of the torque output through the third shaft TM3 at the second forward speed is different from that output through the third shaft TM3 at the first forward speed.

The torque of the third shaft TM3 is converted according to the gear ratio of the first transfer gear set TF1 and the converted torque is input to the seventh shaft TM7 as inverse rotation speed.

The simple planetary gear set SPG becomes the lock-up state by operation of the third clutch C3 such that the torque input through the seventh shaft TM7 is output through the output shaft OS without change of rotation speed. Therefore, the vehicle can run at the second forward speed.

[Third Forward Speed]

The first, second, and third clutches C1, C2, and C3 are operated at the third forward speed D3.

The first shaft TM1 and the second shaft TM2 are connected to the input shaft IS by operation of the first clutch and second clutch C1 and C2 such that the torque of the input shaft IS is input to the first and second shafts TM1 and TM2. Therefore, the compound planetary gear set CPG becomes the lock-up state and the torque of the input shaft IS is output through the third shaft TM3 without change of rotation speed.

The torque of the third shaft TM3 is converted according to the gear ratio of the first transfer gear set TF1 and the converted torque is input to the seventh shaft TM7 as inverse rotation speed.

The simple planetary gear set SPG becomes the lock-up state by operation of the third clutch C3 such that the torque input through the seventh shaft TM7 is output through the output shaft OS without change of rotation speed. Therefore, the vehicle can run at the third forward speed.

[Fourth Forward Speed]

The second and third clutches C2 and C3 and the third brake B3 are operated at the fourth forward speed D4.

In a state that the second shaft TM2 is connected to the input shaft IS by operation of the second clutch C2 and the torque of the input shaft IS is input to the second shaft TM2, the first shaft TM1 is operated as the fixed element by operation of the third brake B3. Therefore, the compound planetary gear set CPG outputs torque converted according to a predetermined gear ratio through the third shaft TM3.

The torque of the third shaft TM3 is converted according to the gear ratio of the first transfer gear set TF1 and the converted torque is input to the seventh shaft TM7 as inverse rotation speed.

The simple planetary gear set SPG becomes the lock-up state by operation of the third clutch C3 such that the torque input through the seventh shaft TM7 is output through the output shaft OS without change of rotation speed. Therefore, the vehicle can run at the fourth forward speed.

[Fifth Forward Speed]

The second, third, and fourth clutches C2, C3, and C4 are operated at the fifth forward speed D5.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed.

The simple planetary gear set SPG becomes the lock-up state by operation of the third clutch C3 such that the torque input through the sixth shaft TM6 is output through the output shaft OS without change of rotation speed. Therefore, the vehicle can run at the fifth forward speed.

Meanwhile, through the second shaft TM2 is connected to the input shaft IS by operation of the second clutch C2 such that the torque of the input shaft IS is input to the second shaft TM2, the torque of the second shaft TM2 does not affect the fifth forward speed. The second and fourth shafts TM2 and TM4 run idle due to rotation speed difference between the torque transmitted to the third shaft TM3 through the seventh shaft TM7 and the torque of the input shaft IS input to the second shaft TM2.

[Sixth Forward Speed]

The second and fourth clutches C2 and C4 and the third brake B3 are operated at the sixth forward speed D6.

In a state that the second shaft TM2 is connected to the input shaft IS by operation of the second clutch C2 and the torque of the input shaft IS is input to the second shaft TM2, the first shaft TM1 is operated as the fixed element by operation of the third brake B3. Therefore, the compound planetary gear set CPG outputs the torque converted according to the predetermined gear ratio through the third shaft TM3.

The torque of the third shaft TM3 is converted according to the gear ratio of the first transfer gear set TF1 and the converted torque is input to the seventh shaft TM7 as inverse rotation speed.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed.

Therefore, the simple planetary gear set SPG outputs torque shifted by a difference between rotation speed of the seventh shaft TM7 and rotation speed of the sixth shaft TM6 through the fifth shaft TM5. Therefore, the vehicle can run at the sixth forward speed.

[Seventh Forward Speed]

The first, second, and fourth clutches C1, C2, and C4 are operated at the seventh forward speed D7.

The first shaft TM1 and the second shaft TM2 are connected to the input shaft IS by operation of the first clutch and second clutch C1 and C2 such that the torque of the input shaft IS is input to the first and second shafts TM1 and TM2. Therefore, the compound planetary gear set CPG becomes the lock-up state and the torque of the input shaft IS is output through the third shaft TM3 without change of rotation speed.

The torque of the third shaft TM3 is converted according to a gear ratio of the first transfer gear set TF1 and the converted torque is input to the seventh shaft TM7 as inverse rotation speed.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed.

Therefore, the simple planetary gear set SPG outputs torque shifted by a difference between rotation speed of the seventh shaft TM7 and rotation speed of the sixth shaft TM6 through the fifth shaft TM5. Therefore, the vehicle can run at the seventh forward speed.

[Eighth Forward Speed]

The second and fourth clutches C2 and C4 and the second brake B2 are operated at the eighth forward speed D8.

In a state that the second shaft TM2 is connected to the input shaft IS by operation of the second clutch C2 and the torque of the input shaft IS is input to the second shaft TM2, the fourth shaft TM4 is operated as the fixed element by operation of the second brake B2. Therefore, the compound planetary gear set CPG outputs the torque converted according to the predetermined gear ratio through the third shaft TM3.

The torque of the third shaft TM3 is converted according to the gear ratio of the first transfer gear set TF1 and the converted torque is input to the seventh shaft TM7 as inverse rotation speed.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed.

Therefore, the simple planetary gear set SPG outputs torque shifted by a difference between rotation speed of the seventh shaft TM7 and rotation speed of the sixth shaft TM6 through the fifth shaft TM5. Therefore, the vehicle can run at the sixth forward speed.

[Ninth Forward Speed]

The first and fourth clutches C1 and C4 and the second brake B2 are operated at the ninth forward speed D9.

In a state that the first shaft TM1 is connected to the input shaft IS by operation of the first clutch C1 and the torque of the input shaft IS is input to the first shaft TM1, the fourth shaft TM4 is operated as the fixed element by operation of the second brake B2. Therefore, the compound planetary gear set CPG outputs the torque converted according to the predetermined gear ratio through the third shaft TM3.

The torque of the third shaft TM3 is converted according to the gear ratio of the first transfer gear set TF1 and the converted torque is input to the seventh shaft TM7 as inverse rotation speed.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed.

Therefore, the simple planetary gear set SPG outputs torque shifted by a difference between rotation speed of the seventh shaft TM7 and rotation speed of the sixth shaft TM6 through the fifth shaft TM5. Therefore, the vehicle runs at the ninth forward speed.

[Tenth Forward Speed]

The fourth clutch C4 and the first and second brakes B1 and B2 are operated at a tenth forward speed D10.

The first shaft TM1 and the second shaft TM2 are stopped by operation of the first and second brakes B1 and B2 such that the compound planetary gear set CPG becomes the lock-up state.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed. At the present state, the seventh shaft TM7 operably connected to the third shaft TM3 is operated as the fixed element.

Therefore, the vehicle can run at the tenth forward speed.

[Eleventh Forward Speed]

The first and fourth clutches C1 and C4 and the first brake B1 are operated at an eleventh forward speed D11.

In a state that the first shaft TM1 is connected to the input shaft IS by operation of the first clutch C1 and the torque of the input shaft IS is input to the first shaft TM1, the second shaft TM2 is operated as the fixed element by operation of the first brake B1. Therefore, the compound planetary gear set CPG outputs torque with inverse rotation speed through the third shaft TM3. The torque of the third shaft TM3 with inverse rotation speed is converted according to the gear ratio of the first transfer gear set TF1, and the converted torque is input to the seventh shaft TM7 of the simple planetary gear set SPG as normal rotation speed.

The torque of the input shaft IS is input to the eighth shaft TM8 by operation of the fourth clutch C4, the torque of the eighth shaft TM8 is converted according to the gear ratio of the second transfer gear set TF2, and the converted torque is transmitted to the sixth shaft TM6 as inverse rotation speed.

Therefore, the simple planetary gear set SPG output torque shifted by a difference between normal rotation speed of the seventh shaft TM7 and inverse rotation speed of the sixth shaft TM6 through the fifth shaft TM5. Therefore, the vehicle can run at the eleventh forward speed.

[Reverse Speed]

The first and third clutches C1 and C3 and the first brake B1 are operated at the reverse speed REV.

In a state that the first shaft TM1 is connected to the input shaft IS by operation of the first clutch C1 and the torque of the input shaft IS is input to the first shaft TM1, the second shaft TM2 is operated as the fixed element by operation of the first brake B1. Therefore, the compound planetary gear set CPG outputs the torque with inverse rotation speed through the third shaft TM3. The torque of the third shaft TM3 with inverse rotation speed is converted according to the gear ratio of the first transfer gear set TF1, and the converted torque is input to the seventh shaft TM7 of the simple planetary gear set SPG as normal rotation speed.

The simple planetary gear set SPG becomes the lock-up state by operation of the third clutch C3 such that the torque input through the seventh shaft TM7 is output through the output shaft OS without change of rotation speed. Therefore, the vehicle can run at the reverse speed.

Figure 7:
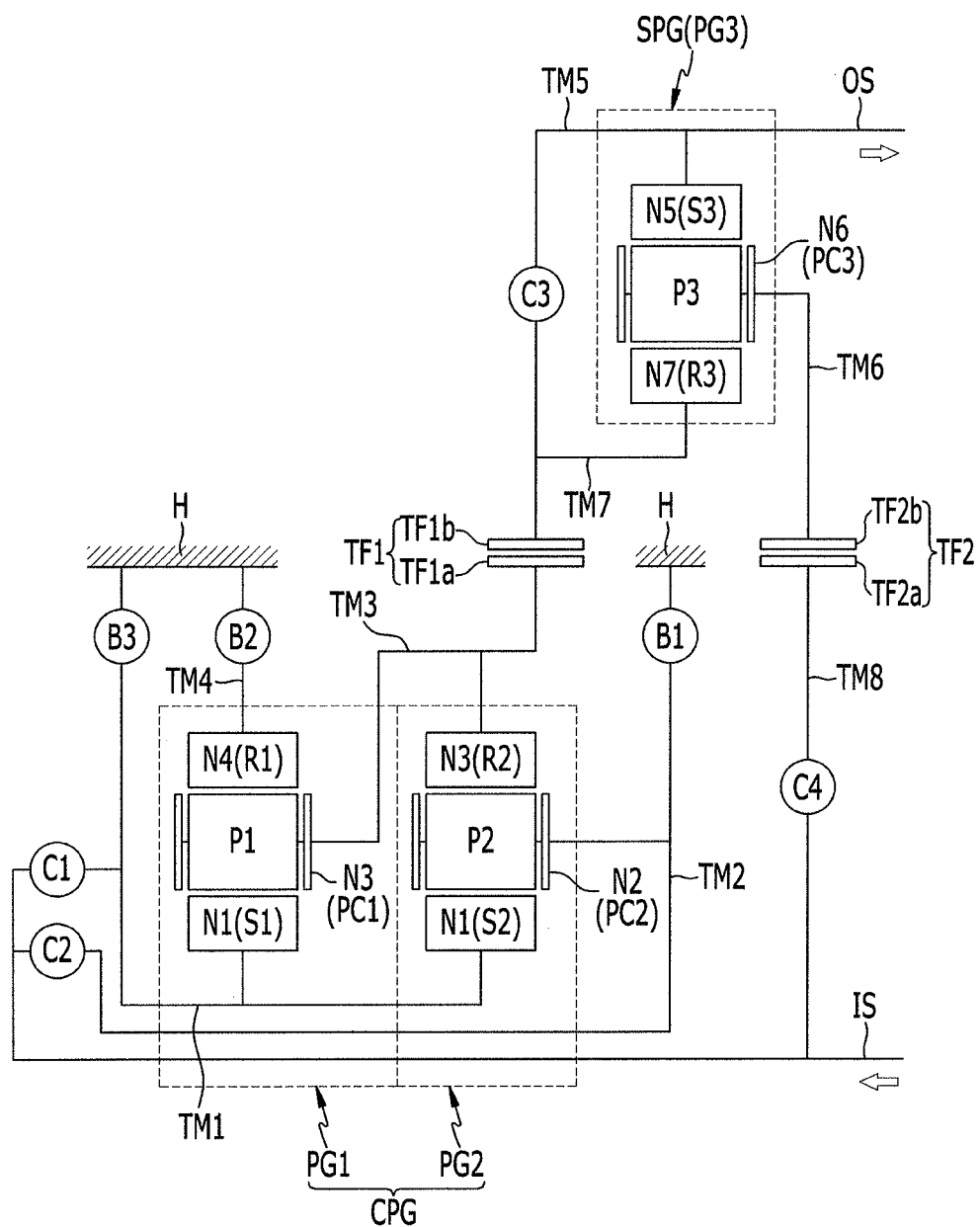
FIG. 7 is a schematic diagram of a planetary gear train according to the various exemplary embodiments of the present invention.

FIG. 7 is a schematic diagram of a planetary gear train according to the various exemplary embodiments of the present invention.

Referring to FIG. 7, a third brake B3 is additionally disposed between the first shaft TM1 and the transmission housing of the planetary gear train according to the various exemplary embodiments such that the first shaft TM1 is operated as a selective input element and a selective fixed element in a planetary gear train according to the various exemplary embodiments of the present invention. Therefore, the planetary gear train according to the various exemplary embodiments of the present invention can achieve eleven forward speeds and one reverse speed.

Since operation and shifting processes of the planetary gear train according to the various exemplary embodiments of the present invention are the same as those according to the various exemplary embodiments of the present invention in FIG. 3, detailed description of the various exemplary embodiments will be omitted.

Figure 8:
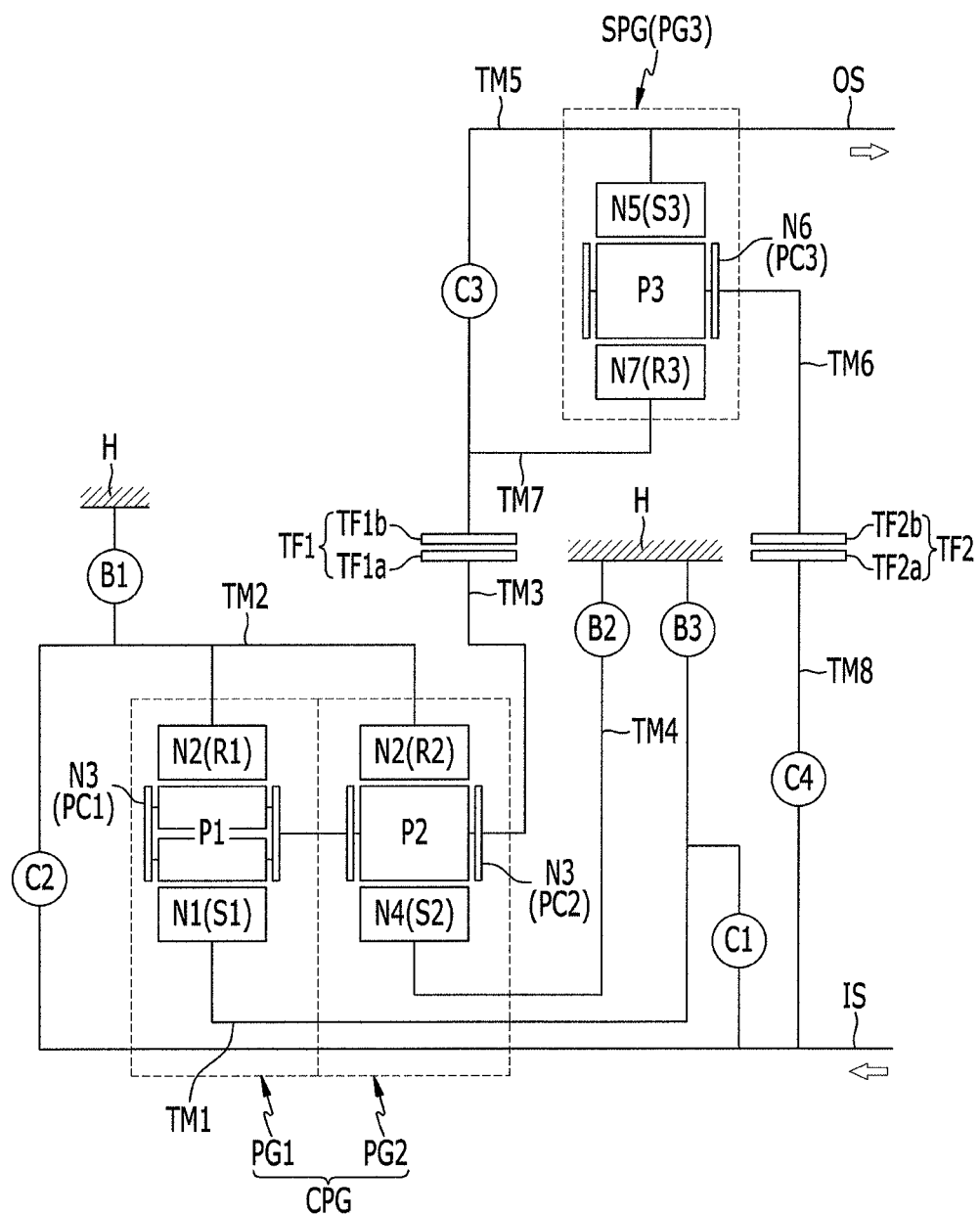
FIG. 8 is a schematic diagram of a planetary gear train according to the various exemplary embodiments of the present invention.

FIG. 8 is a schematic diagram of a planetary gear train according to the various exemplary embodiments of the present invention.

Referring to FIG. 8, a third brake B3 is additionally disposed between the first shaft TM1 and the transmission housing of the planetary gear train according to the various exemplary embodiments such that the first shaft TM1 is operated as a selective input element and a selective fixed element in a planetary gear train according to the various exemplary embodiments of the present invention. Therefore, the planetary gear train according to the various exemplary embodiments of the present invention can achieve eleven forward speeds and one reverse speed.

Since operation and shifting processes of the planetary gear train according to the various exemplary embodiments of the present invention are the same as those according to the various exemplary embodiments of the present invention in FIG. 4, detailed description of the various exemplary embodiments will be omitted.

The planetary gear train according to the exemplary embodiments of the present invention may reduce a length of the transmission and improve installability by dividedly disposing three planetary gear sets on the input shaft and the output shaft disposed in parallel with and spaced from each other.

Furthermore, optimum gear ratios may be set due to ease of changing gear ratios by use of two transfer gear sets as well as the planetary gear sets. Since gear ratios may be changed according to target performance, starting performance may be improved. Therefore, a start-up clutch instead of a torque converter may be used.

Furthermore, the planetary gear train according to the exemplary embodiments of the present invention may improve power delivery performance and fuel economy by realizing more than nine forward speeds.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A planetary gear train apparatus of an automatic transmission for a vehicle, the planetary gear train apparatus comprising:
   an input shaft receiving torque of an engine;
   an output shaft outputting torque and disposed in parallel with the input shaft;
   a compound planetary gear set having first, second, third, and fourth rotation elements and disposed at a radial external side of the input shaft;
   a simple planetary gear set having fifth, sixth, and seventh rotation elements and disposed at a radial external side of the output shaft;
   a first shaft fixedly connected to the first rotation element and selectively connectable to the input shaft;
   a second shaft fixedly connected to the second rotation element and selectively connectable to the input shaft and a transmission housing;
   a third shaft fixedly connected to the third rotation element;
   a fourth shaft fixedly connected to the fourth rotation element and selectively connectable to the transmission housing;
   a fifth shaft fixedly connected to the fifth rotation element and fixedly connected to the output shaft;
   a sixth shaft fixedly connected to the sixth rotation element;
   a seventh shaft fixedly connected to the seventh rotation element and operably connected to the third shaft; and
   an eighth shaft selectively connectable to the input shaft and operably connected to the sixth shaft.

2. The planetary gear train apparatus of claim 1, further including:
   a first transfer gear set disposed between the third shaft and the seventh shaft and operably connecting the third shaft to the seventh shaft; and
   a second transfer gear set disposed between the sixth shaft and the eighth shaft and operably connecting the sixth shaft to the eighth shaft.

3. The planetary gear train apparatus of claim 2, further including:
   four clutches, each selectively connecting one shaft among the input shaft and the first to eighth shafts to another shaft among the first to eighth shafts; and
   two brakes, each selectively connecting one of the second shaft and the fourth shaft to the transmission housing.

4. The planetary gear train apparatus of claim 3, wherein the four clutches comprise:
   a first clutch mounted between the input shaft and the first shaft;
   a second clutch mounted between the input shaft and the second shaft;
   a third clutch mounted between the fifth shaft and the seventh shaft; and
   a fourth clutch mounted between the input shaft and the eighth shaft, and wherein the two brakes comprise:
   a first brake mounted between the second shaft and the transmission housing; and
   a second brake mounted between the fourth shaft and the transmission housing.

5. The planetary gear train apparatus of claim 3, further including a third brake mounted between the first shaft and the transmission housing.

6. The planetary gear train apparatus of claim 1, wherein the compound planetary gear set includes:
   a first planetary gear set being a single pinion planetary gear set and having a first sun gear, a first planet carrier, and a first ring gear as rotation elements of the first planetary gear set; and
   a second planetary gear set being a single pinion planetary gear set and having a second sun gear, a second planet carrier, and a second ring gear as rotation elements of the second planetary gear set,
   wherein the first rotation element is the first sun gear, the second rotation element is the first planet carrier and the second ring gear fixedly connected to each other, the third rotation element is the first ring gear and the second planet carrier fixedly connected to each other, and the fourth rotation element is the second sun gear,
   wherein the simple planetary gear set is a single pinion planetary gear set and has a third sun gear, a third planet carrier, and a third ring gear as rotation elements of the simple planetary gear set, and
   wherein the fifth rotation element is the third sun gear, the sixth rotation element is the third planet carrier, and the seventh rotation element is the third ring gear.

7. The planetary gear of claim 1, wherein the compound planetary gear set includes:
   a first planetary gear set being a single pinion planetary gear set and having a first sun gear, a first planet carrier, and a first ring gear as rotation elements of the first planetary gear set; and
   a second planetary gear set being a single pinion planetary gear set and having a second sun gear, a second planet carrier, and a second ring gear as rotation elements of the second planetary gear set,
   wherein the first rotation element is the first and second sun gears fixedly connected to each other, the second rotation element is the second planet carrier, the third rotation element is the first planet carrier and the second ring gear fixedly connected to each other, and the fourth rotation element is the first ring gear,
   wherein the simple planetary gear set is a single pinion planetary gear set and has a third sun gear, a third planet carrier, and a third ring gear as rotation elements of the simple planetary gear set, and
   wherein the fifth rotation element is the third sun gear, the sixth rotation element is the third planet carrier, and the seventh rotation element is the third ring gear.

8. The planetary gear of claim 1, wherein the compound planetary gear set includes:
   a first planetary gear set begin a double pinion planetary gear set and having a first sun gear, a first planet carrier, and a first ring gear as rotation elements of the first planetary gear set; and
   a second planetary gear set being a single pinion planetary gear set and having a second sun gear, a second planet carrier, and a second ring gear as rotation elements of the second planetary gear set, wherein the first rotation element is the first sun gear, the second rotation element is the first and second ring gears fixedly connected to each other, the third rotation element is the first and second planet carriers fixedly connected to each other, and the fourth rotation element is the second sun gear, wherein the simple planetary gear set is a single pinion planetary gear set and has a third sun gear, a third planet carrier, and a third ring gear as rotation elements of the simple planetary gear set, and wherein the fifth rotation element is the third sun gear, the sixth rotation element is the third planet carrier, and the seventh rotation element is the third ring gear.

9. A planetary gear train apparatus of an automatic transmission for a vehicle, the planetary gear train apparatus comprising:
an input shaft receiving torque of an engine;
an output shaft outputting torque and disposed in parallel with the input shaft;
a compound planetary gear set including a first planetary gear set having a first sun gear, a first planet carrier, and a first ring gear as rotation elements of the first planetary gear set, and a second planetary gear set having a second sun gear, a second planet carrier, and a second ring gear as rotation elements of the second planetary gear set, wherein the compound planetary gear set includes first, second, third, and fourth rotation elements by fixedly connecting two rotation elements among the rotation elements of the first planetary gear set to two rotation elements among the rotation elements of the second planetary gear set, and is disposed at a radial external side of the input shaft; and
a simple planetary gear set having a third sun gear, a third planet carrier, and a third ring gear as rotation elements of the simple planetary gear set and disposed at a radial external side of the output shaft,
wherein the first rotation element is selectively connectable to the input shaft,
wherein the second rotation element is selectively connectable to the input shaft and a transmission housing,
wherein the fourth rotation element is selectively connectable to the transmission housing,
wherein the third sun gear is fixedly connected to the output shaft,
wherein the third planet carrier is selectively and operably connected to the input shaft, and
wherein the third ring gear is selectively connectable to the third sun gear and is operably connected to the third rotation element.

10. The planetary gear train apparatus of claim 9, further including:

a first transfer gear set disposed between the third rotation element and the third ring gear and operably connecting the third rotation element to the third ring gear; and
a second transfer gear set disposed between the third planet carrier and the input shaft and operably connecting the third planet carrier to the input shaft.

11. The planetary gear train apparatus of claim 10, further including:
a first clutch mounted between the input shaft and the first rotation element;
a second clutch mounted between the input shaft and the second rotation element;
a third clutch mounted between the third sun gear and the third ring gear;
a fourth clutch mounted between the input shaft and the second transfer gear set;
a first brake mounted between the second rotation element and the transmission housing; and
a second brake mounted between the fourth rotation element and the transmission housing.

12. The planetary gear train apparatus of claim 11, further including a third brake mounted between the first rotation element and the transmission housing.

13. The planetary gear train apparatus of claim 9,
wherein each of the first and second planetary gear sets and the simple planetary gear set is a single pinion planetary gear set, and
wherein the first rotation element is the first sun gear, the second rotation element is the first planet carrier and the second ring gear fixedly connected to each other, the third rotation element is the first ring gear and the second planet carrier fixedly connected to each other, and the fourth rotation element is the second sun gear.

14. The planetary gear train apparatus of claim 9,
wherein each of the first and second planetary gear sets and the simple planetary gear set is a single pinion planetary gear set, and
wherein the first rotation element is the first and second sun gears fixedly connected to each other, the second rotation element is the second planet carrier, the third rotation element is the first planet carrier and the second ring gear fixedly connected to each other, and the fourth rotation element is the first ring gear.

15. The planetary gear train apparatus of claim 9,
wherein the first planetary gear set is a double pinion planetary gear set and each of the second planetary gear set and the simple planetary gear set is a single pinion planetary gear set, and:
wherein the first rotation element is the first sun gear, the second rotation element is the first and second ring gears fixedly connected to each other, the third rotation element is the first and second planet carriers fixedly connected to each other, and the fourth rotation element is the second sun gear.

* * * * *